Figure 1:
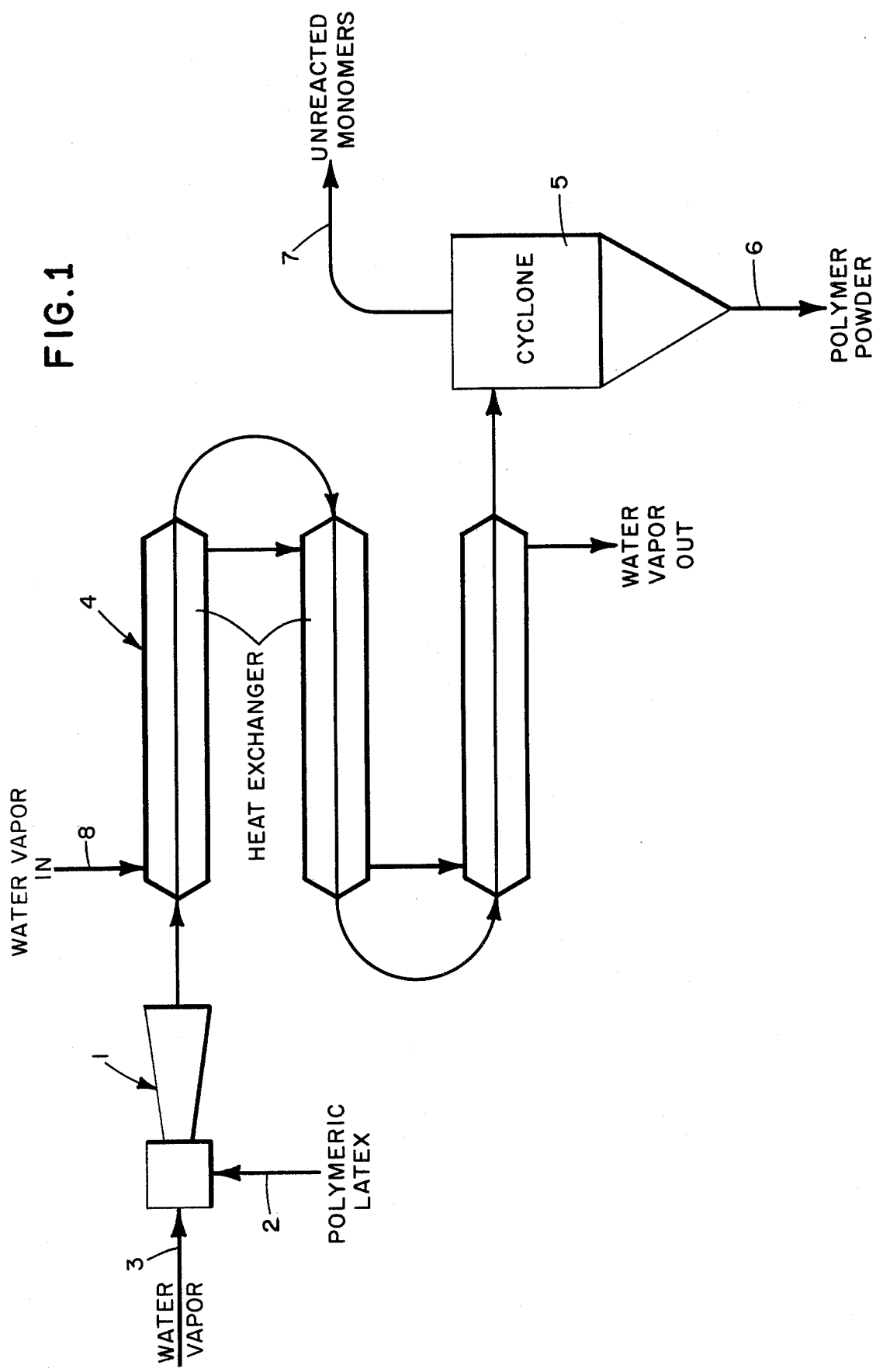

United States Patent [19]
Govoni et al.

[11] 4,334,057
[45] Jun. 8, 1982

[54] CONTINUOUS PROCESS FOR RECOVERING POLYMERS FROM THEIR LATEXES

[75] Inventors: Gabriele Govoni, Renazzo; Gianfranco Rubichi; Pierluigi Guardigli, both of Ferrara, all of Italy

[73] Assignee: Montedison S.p.A., Milan, Italy

[21] Appl. No.: 218,085

[22] Filed: Dec. 19, 1980

[30] Foreign Application Priority Data

Dec. 20, 1979 [IT] Italy ................................ 28276 A/79

[51] Int. Cl.³ ............................ C08F 6/06; C08F 6/10
[52] U.S. Cl. ..................................... 528/500; 528/501; 528/503
[58] Field of Search ......................... 528/499, 500, 501

[56] References Cited

U.S. PATENT DOCUMENTS

| | | | |
|---|---|---|---|
| 3,256,251 | 6/1966 | Carey | 528/500 |
| 3,968,003 | 7/1976 | Wolfe | 159/48 R |
| 4,020,032 | 4/1977 | Kalka | 260/29.6 R |
| 4,209,436 | 6/1980 | Creemers | 528/500 X |
| 4,212,967 | 7/1980 | Govoni | 528/500 |

*Primary Examiner*—C. A. Henderson

[57] ABSTRACT

Polymers are continuously recovered from their latexes obtained by polymerization in emulsion by a process comprising the following steps:

(A) feeding the polymeric latexes containing 10 to 50% by weight of polymer, at a temperature of from 10° to 120° C., through one or more feeding channels, to the narrow zone or to the divergent section of a nozzle in which water vapor flows at sonic or supersonic speed respectively, according to vapor/latex feeding ratios of 0.1-2 Kg of vapor/Kg of latex, where the latex is subdivided by the water vapor into a dispersion of particles; and (B) continuously feeding the dispersion obtained in step (A) to a tube or an exchanger of the type tube-in-tube directly connected with the divergent section of the nozzle where the dispersion, at a temperature of 100°-150° C. for residence times of from 0.1 to 1 second, maintains a speed of 50-150 m/sec., so providing a dispersion of solid caked particles of polymer and of liquid particles in a vapor phase comprising the unreacted monomers and the water vapor, the vapor phase being separated from the dispersion by means of known methods.

4 Claims, 2 Drawing Figures

CONTINUOUS PROCESS FOR RECOVERING POLYMERS FROM THEIR LATEXES

BACKGROUND OF THE INVENTION

It is known that, in the polymerization-in-emulsion processes, polymeric latexes are obtained which contain residual monomers from which polymers substantially free from said monomers are to be recovered.

It is known, too, that the conventional processes for removing the residual monomers from the polymeric latexes and for separating the polymers from said latexes exhibit several drawbacks deriving from the formation of foams, coagulums and foulings in general, which render difficult and expensive the running of the separation apparatuses and, above all, do not permit to attain, in an economic manner, low contents of residual monomers in the separated polymer.

Several methods have been suggested for removing residual monomers from polymeric latexes by distillation (stripping) in a vapor stream.

According to one of these methods, the latex is partially evaporated in a tray exchanger and then separated from the vapors in a column.

In order to reach low percentages of residual monomers, said operations are carried out in 2, 3 or more steps.

According to another method the residual monomers are removed by using thin layer centrifugal apparatuses. Said methods involve the use of expensive and low-productive equipments, the operating and maintenance costs of which are very high.

Also, the recovery of the polymers from their latexes, which is usually effected by coagulation by means of proper coagulating agents such as $CaCl_2$, $Al_2(SO_4)_3$ and the like, exhibits some drawbacks due to the fact that it is necessary to employ large apparatuses, which run under onerous operating conditions owing to the forming of foulings and because it is necessary to remove, also, the coagulating agents introduced into the latex.

THE PRESENT INVENTION

It is an object of the present invention to reduce the steps of the known separation processes and to avoid all the operations of stripping in a vapor stream, centrifugation and coagulation, so minimizing the consumption of energy.

It is another object of this invention to obtain solid particles of polymer having a high apparent density and being substantially free from residual monomers.

A further object is to obtain polymer particles having a controlled morphology and granulometry, such as to be directly utilized in extruding machines.

Still another object is to prepare polymers endowed with high qualities and improved characteristics in respect of those obtained by means of the conventional separation processes, in particular due to the absence of antifoaming compounds, coagulating compounds, electrolytes and anticorrosive buffer agents.

These and other objects as will appear are achieved by the present invention in accordance with which we have found that is is possible to obtain, directly from the polymeric latexes, both the removal of the residual monomers and the separation of the polymers by means of a continuous process which, besides avoiding the drawbacks of the previously known separation methods, attains a very high productivity in an apparatus having reduced dimensions and with low water vapor consumptions.

The above-mentioned objects and still others are achieved by a continuous process comprising the following steps:

(A) Feeding the polymeric latexes having a polymer content from about 10% to about 50% by weight, at a temperature ranging from 10° C. to 120° C., through one or more feeding channels to the narrow zone or the divergent section of a nozzle through which water vapor flows respectively at sonic or supersonic speed, keeping vapor/latex feeding ratios of 0.1–2 Kg of vapor/Kg of latex, where the latex is subdivided by the water vapor into a dispersion of particles; and (B) continuously feeding the dispersion obtained in step (A) to a tube or an exchanger of the type tube-in-tube directly connected with the divergent section of the nozzle, where the dispersion, at a temperature of 100°–150° C. for residence times of from 0.1 to 1 second, maintains a speed of 50 to 150 m/sec. and where the polymer cakes in the form of solid particles which, together with liquid particles, are dispersed in a vapor phase comprising the unreacted monomers and the water vapor.

The vapors containing the unreacted monomers are then separated from the dispersion resulting from step (B) according to any known method, for example by employing a cyclone.

The solid polymer particles so separated can be subjected to a washing with water in order to remove the soaps and the emulsifying agents in general and/or can be subjected to a successive drying according to conventional methods for obtaining a polymer with controlled residual humidity.

If the polymer particles are to be subjected to purification by means of aqueous washings, it is sufficient to use, in step (B), a simple unheated tube; otherwise, it is necessary to use an exchanger of the type tube-in-tube, which reaches an average heat exchange coefficient of from 500 to 1500 $Kcal/hm^{2}°C$.

According to this process it is possible to advantageously treat latexes of polymers and copolymers of any type.

Particularly suitable latexes are, for example, those obtained by polymerization-in-emulsion of styrene, or by copolymerization-in-emulsion of acrylonitrile with α-methyl styrene, of acrylonitrile with styrene, of acrylonitrile with styrene and α-methylstyrene and of butadiene with acrylonitrile and styrene, generally containing from 25 to 40% by weight of polymer of copolymer calculated on a dry basis.

Caking of the polymer in the form of particles—the morphology and bulk density of which can be controlled by acting on the operating conditions specified in steps (A) and (B), which are strictly connected with each other—occurs in the tube or in the tube exchanger of step (B).

The tube or the tube exchanger may have a straight-away or spiral run, or a straightaway run jointed by 180° bends.

By the process of this invention, it is possible to obtain solid polymer particles having an apparent density of 0.4–0.6 $kg/dm^3$ with an angle of rest of 40° and practically free from residual monomers.

It is to be pointed out that all the steps and the operating conditions of this process are strictly connected with one another and are essential in order to achieve a very high economy and efficiency.

The apparatus utilized to practice this process has very reduced dimensions, is compact, simple, flexible, without any fouling problems, with very low consumptions of water vapor, which permits to get high productivity conditions in a very economic manner.

Figure 2:
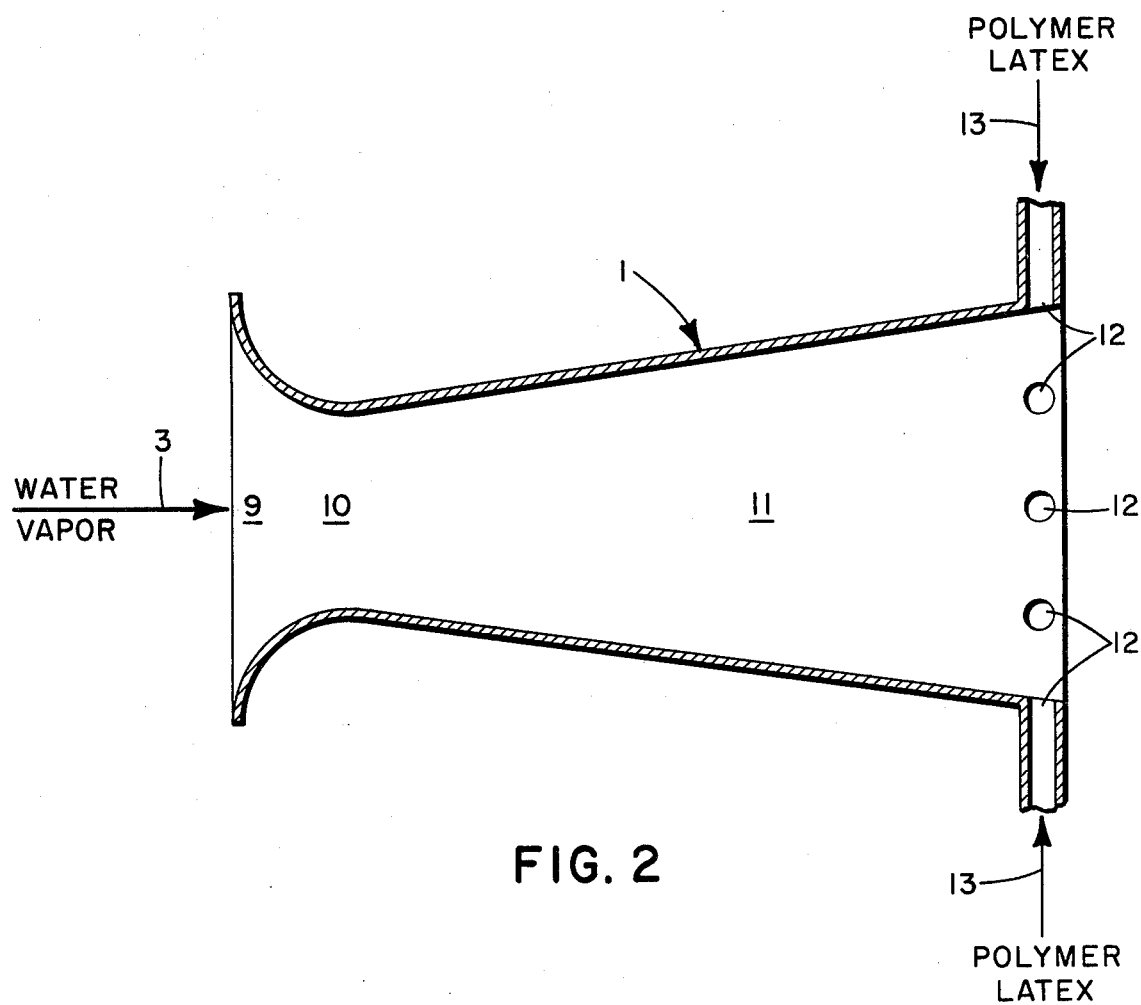

In the accompanying drawing:

FIG. 1 is a schematic showing of an apparatus suitable for practicing the process according to this invention; and FIG. 2 is an axial sectional view of a nozzle of a type suitable for use in practicing the invention.

Referring to FIG. 1, 1 is a nozzle to which water vapor is fed in the direction of arrow 3 and the polymeric latex in the direction of arrow 2; 4 is an exchanger in which the dispersion obtained at the nozzle outlet flows; 5 is a cyclone at which the dispersion arrives after having left the exchanger. The outlet of the polymer powder is in the direction of arrow 6 and the outlet of the water vapor and of the unreacted monomers in the direction of arrow 7. The inlet of the water vapor into the jacket of the tube-in-tube exchanger 4 is in the direction of arrow 8.

With reference to FIG. 2, nozzle 1 (which is illustrative of the kind of nozzle useful in practicing the present process), through which the water vapor flows in the direction of arrow 3, comprises a convergent zone 9, a narrow zone 10, and a divergent zone 11 into which channels 12 feed the polymer latex in the direction of arrow 13.

The following example is given to illustrate the present invention, without being, however, a limitation thereof.

EXAMPLE I

Using apparatus as shown schematically in FIG. 1 of the drawing, nozzle 1 was continuously and simultaneously fed with:

in the direction of arrow 3: 250 kg/h of water vapor at a pressure of 4 kg/cm$^2$ and at a temperature of 155° C.;

in the direction of arrow 2, in particular in the divergent section of nozzle 1: 400 kg/h of polymeric latex at 25° C. having a content of 30% by weight of an acrylonitrile/α-methylstyrene copolymer containing 28% by wt. of acrylonitrile and 72% by weight of α-methylstyrene and having an intrinsic viscosity of 0.43, and in which 17,000 ppm of acrylonitrile and 10,000 ppm of α-methylstyrene were present as unreacted monomers.

The resulting dispersion passed directly into tube 4, having an inside diameter of 25 mm and a total length of 20 m with 2 180° bends, which in this case was not heated with steam since the copolymer particles had to be successively purified by means of water washings.

At the outlet of the tube 4, the dispersion flowed into cyclone 5 where the vapors, at a temperature of 125° C., separated from the copolymer, which collected on the bottom of the cyclone in the form of solid and wet particles.

The copolymer particles were successively separated from the water by filtering; an analysis of the separated water established that the caking of the solid was total.

The copolymer particles were then subjected to purification by washing with water, filtered and finally dried.

The resulting copolymer particles contained less than 5 ppm of acrylonitrile and less than 500 ppm of α-methylstyrene. The apparent density of the copolymer particles was 0.4 kg/dm$^3$. Their granulometric distribution is recorded in the following table.

TABLE

| Effective diameters of the screen meshes expressed in microns | 2380 | 2000 | 1000 | 500 | 250 | 180 |
|---|---|---|---|---|---|---|
| % by weight | 4 | 10 | 48 | 23 | 14 | 1 |

What is claimed is:

1. A continuous process for the recovery of polymers from their latexes obtained by emulsion polymerization, said process consisting of the following phases:
   (A) feeding the polymeric latexes containing from 10 to 50% by weight of polymer, at a temperature of from 10° to 120° C., through one or more feeding channels to the narrow zone or the divergent section of a nozzle in which water vapor flows at sonic or supersonic speed respectively, maintaining vapor latex feeding ratios of 0.1–2 kg of vapor/kg of latex, the latex being subdivided by the water vapor into a dispersion of particles; and
   (B) continuously feeding the dispersion obtained in step (A) to a tube or to an exchanger of the type tube-in-tube directly connected with the divergent section of the nozzle where the dispersion, at a temperature of 100°–150° C. for residence times ranging from 0.1 to 1 second, maintains a speed of 50–150 m/sec., thus obtaining a dispersion of solid caked particles of polymer and of liquid particles in a vapor phase comprising the unreacted monomers and the water vapor, and separating the vapor phase from the dispersion.

2. The process of claim 1, in which the polymers contained in the latex are selected from the group consisting of polymers of styrene, acrylonitrile/α-methylstyrene copolymers, acrylonitrile/styrene copolymers, acrylonitrile/stryene/α-methylstyrene terpolymers and butadiene/acrylonitrile/styrene terpolymers.

3. The process according to claim 1, in which the tube-in-tube exchanger yields an average heat exchange coefficient of 500–1500 Kcal/h m$^2$°C.

4. The process of claim 1, in which the separation of the solid particles of polymer from the vapor phase is carried out in a cyclone.

* * * * *